United States Patent
Zhao

(10) Patent No.: US 7,136,589 B2
(45) Date of Patent: Nov. 14, 2006

(54) RE-CONFIGURABLE OPTICAL ADD-DROP MULTIPLEXER

(75) Inventor: Ximin Zhao, San Jose, CA (US)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 691 days.

(21) Appl. No.: 10/190,252

(22) Filed: Jul. 5, 2002

(65) Prior Publication Data

US 2004/0208580 A1    Oct. 21, 2004

(51) Int. Cl.
*H04J 14/02*    (2006.01)

(52) U.S. Cl. .............................. 398/83; 398/84; 398/87

(58) Field of Classification Search ............ 398/83–87, 398/20–21
See application file for complete search history.

(56) References Cited

U.S. PATENT DOCUMENTS

| | | | | |
|---|---|---|---|---|
| 5,726,785 A | * | 3/1998 | Chawki et al. ................ | 398/84 |
| 5,982,791 A | * | 11/1999 | Sorin et al. ................... | 372/25 |
| 6,853,759 B1 | * | 2/2005 | Samara-Rubio et al. ...... | 385/12 |
| 6,856,732 B1 | * | 2/2005 | Liu et al. ...................... | 385/38 |
| 2002/0176088 A1 | * | 11/2002 | Johnson et al. ............. | 356/477 |
| 2003/0091274 A1 | * | 5/2003 | Vohra et al. .................. | 385/24 |
| 2004/0146240 A1 | * | 7/2004 | Zhang et al. ................. | 385/24 |

\* cited by examiner

*Primary Examiner*—Dzung Tran
(74) *Attorney, Agent, or Firm*—Wei Te Chung

(57) ABSTRACT

A re-configurable optical add-drop multiplexer (OADM) (800) includes a first optical circulator (10), a second optical circulator (30), and a fiber Bragg grating (FBG) (20). The first optical circulator has a first circulator port (11), a second circulator port (12), and a third circulator port (13). The second optical circulator has the same structure as the first optical circulator. The FBG has a first state where it reflects an optical signal with a particular wavelength and passes all other wavelengths, and a second state where all the optical signals pass through it. The signal of the particular wavelength can thus be dropped from the optical signals by reflection of the FBG and output from the third circulator port of the first optical circulator, and a new signal of the same dropped wavelength can be added into the optical signals through a first circulator port (31) of the second optical circulator.

19 Claims, 3 Drawing Sheets

RE-CONFIGURABLE OPTICAL ADD-DROP MULTIPLEXER

BACKGROUND OF THE INVENTION

1. Field of the Invention

The present invention relates to an optical add-drop multiplexer (OADM), and particularly to a re-configurable OADM.

2. Description of Related Art

Wavelength division multiplexing (WDM) is widely used in optical communication systems. There is a need to route one or more channels of a WDM signal to different destinations. Thus, an optical add-drop multiplexer (OADM) is introduced into the optical communication system to drop optical signals having desired wavelengths from an optical WDM signal and to add optical signals having the same wavelengths and carrying new information. The OADM also needs to be re-configurable to be flexibly accommodated in various applications.

U.S. Pat. No. 6,035,080 discloses a re-configurable OADM including a re-configurable add-drop unit that can add-drop one channel out of a large set by mechanically switching the light path through one of a set of fixed add-drop filters. Re-configuration is done by switching from the add-drop filter path to a bypass path, changing to a different add-drop filter, and then switching back. However, only one of the set of fixed add-drop filters can be used to add-drop one channel, so this re-configurable OADM is not cost-efficient. In addition, the number of channels which can be dropped by this re-configurable OADM is unchangeable.

Therefore, an improved re-configurable OADM is required to overcome the above problems.

SUMMARY OF THE INVENTION

Accordingly, an object of the present invention is to provide a re-configurable which is cost-efficient.

Another object of the present invention is to provide a re-configurable OADM wherein the number of the dropped channels is changeable.

In order to achieve the objects set forth above, a re-configurable OADM according to the present invention includes a first optical circulator, a second optical circulator and a fiber Bragg grating (FDG). The first optical circulator has a first circulator port, a second circulator port, and a third circulator port. An optical signal passing into the first circulator port is routed to the second circulator port, and an optical signal passing into the second circulator port is routed to the third circulator port. The second optical circulator has a first circulator port, a second circulator port and a third circulator port, and the second optical circulator has the same structure as that of the first optical circulator The FBG has an optical fiber, a cooler, and a plurality of heating elements. The optical fiber has an optical fiber core made of a material whose index of refraction varies with temperature. The heating elements are evenly arranged on the optical fiber, separated from one another by a fixed distance, and the cooler is mounted on the optical fiber to maintain sections of the optical fiber between adjacent heating elements at a pre-determined temperature. The FBG has a first state in which it reflects an optical signal with a particular wavelength, and a second state in which all the optical signals pass through the FBG. The FBG is connected with the second circulator port of the first optical circulator, and with the second circulator port of the second optical circulator. At time when the FBG is selected to be in the first state, an optical signal can be added to the optical WDM signal through the first port of the second optical circulator, and an optical signal can be dropped from the optical WDM signal through the third circulator port of the first optical circulator.

Other objects, advantages and novel features of the invention will become more apparent from the following detailed description when taken in conjunction with the accompanying drawings.

DETAILED DESCRIPTION OF THE INVENTION

Figure 1:
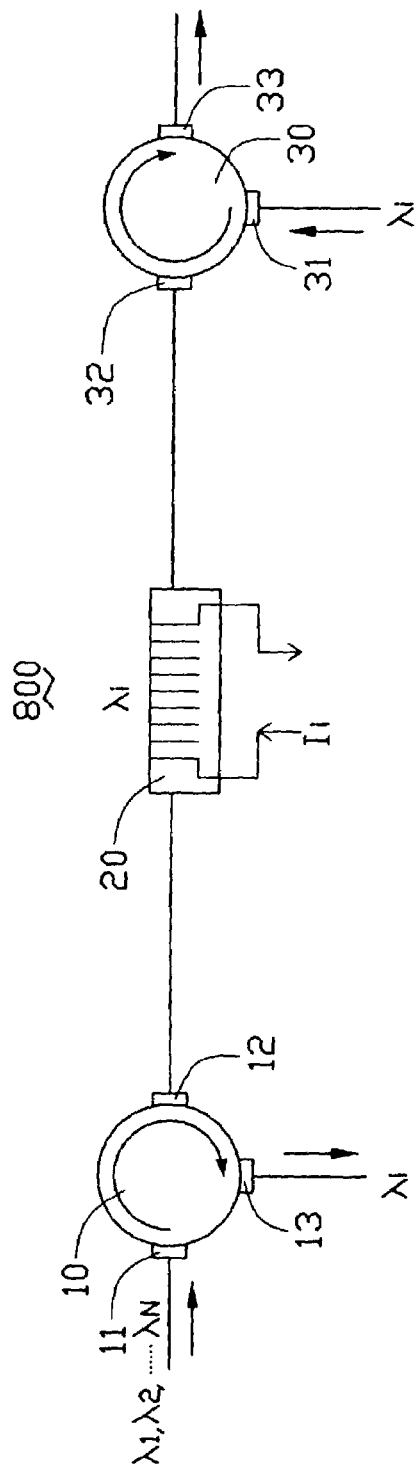
FIG. 1 is a schematic view of a re-configurable optical add-drop multiplexer (OADM) in accordance with a first embodiment of the present invention.

Referring to FIG. 1, an optical wavelength division multiplexing (WDM) signal passes into a re-configurable optical add-drop multiplexer (OADM) 800 in accordance wit a first embodiment of the present invention. The optical WDM signal includes a plurality of optical signals with different wavelengths from $\lambda_1$ to $\lambda_N$ wherein N is an integer higher than 1. The re-configurable OADM 800 includes a first optical circulator 10, a second optical circulator 30, and a fiber Bragg grating (FBG) 20.

The first optical circulator 10 includes a first circulator port 11, a second circulator port 12, and a third circulator port 13. An optical signal passing into the first circulator port 11 is routed to the second circulator port 12, and an optical signal passing into the second circulator port 12 is routed to the third circulator port 13. Similarly, the second optical circulator 30 includes a first circulator port 31, a second circulator port 32, and a third circulator port 33. An optical signal passing into the first circulator port 31 is routed to the second circulator port 32, and an optical signal passing into the second circulator port 32 is routed to the third circulator port 33.

Referring to FIGS. 3–6, the FBG 20 includes a cylindrical optical fiber 22 forming an optical fiber core 220 therein, a thermal electric cooler (TEC) 23 and a resistor 24. Instead of utilizing the photosensitivity of different optical materials, the FBG 20 takes advantage of the fact that the index of refraction (n) of some optical materials varies with temperature. Both silica-based materials and many different optical polymers demonstrate such a relationship. For instance, the index of refraction, n, of silica increases with increasing temperature.

The TEC 23 is mounted on one side of one section of the optical fiber 22, which side has been polished into a flat surface. The TEC 23 makes a good physical contact with the flat surface. A thin layer of thermal epoxy can be applied to the flat surface to ensure good thermal conductivity between the optical fiber 22 and the TEC 23. The TEC 23 acts as a heat sink and as a temperature controller to maintain the section of the optical fiber 22 at a pre-determined temperature.

Figure 4:
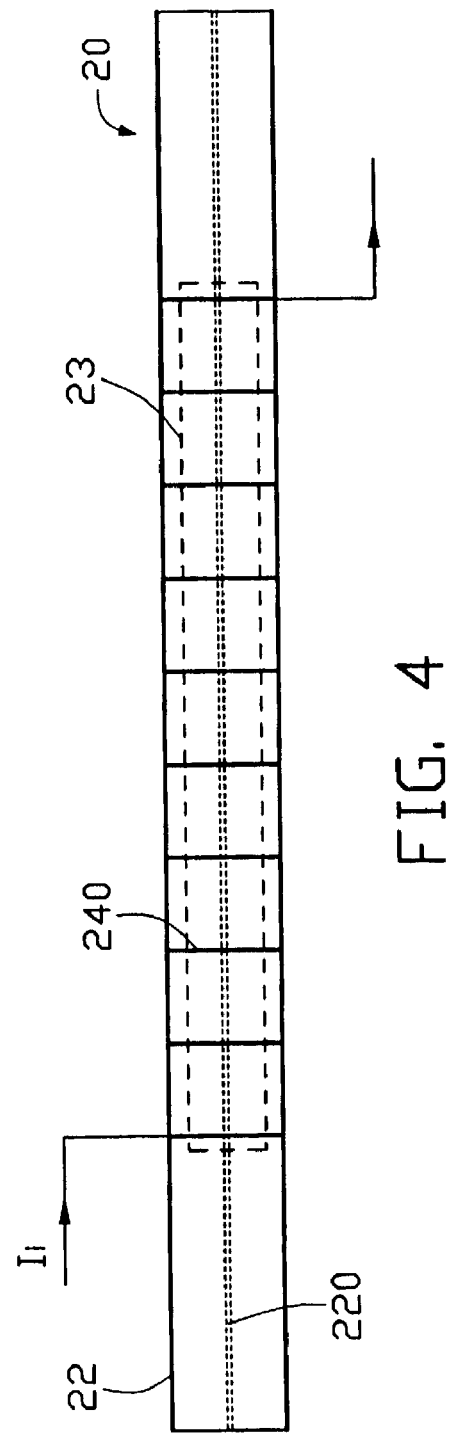
FIG. 4 is a top view of the FBG of FIG. 3.
Figure 5:
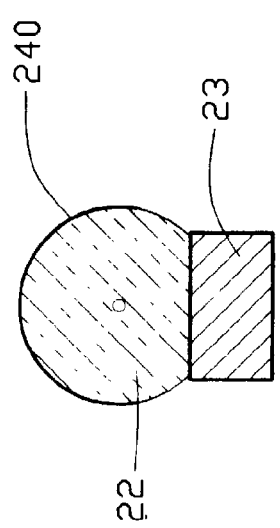
FIG. 5 is a cross-sectional view of the FBG of FIG. 3, taken along line V—V of FIG. 3.
Figure 6:
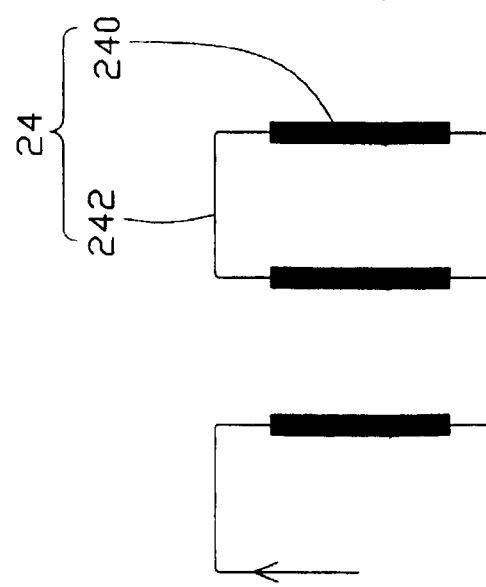
FIG. 6 is a schematic diagram showing connections between micro heating elements of a resistor of the FBG of FIG. 3.

Referring to FIG. 4, the resistor 24 includes a plurality of micro heating elements 240 and a plurality of bonding wires 242 connecting the micro heating elements 240 together. The micro heating elements 240 are deposited in an evenly spaced pattern on an outside surface of the optical fiber 22 by deposition or photolithography, each micro heating element 240 having a shape of the letter "C", with an opening thereof facing the TEC 23 (best seen in FIG. 5). Each micro heating element 240 can be a very thin layer of metal or other material that conducts current. The micro heating elements 240 are connected in series by the bonding wires 242; that is, one end of a micro heating element 240 is wire bonded to a neighboring micro heating element 240 in front of it by one of the bonding wires 242, while the other end is wire bonded to another neighboring heating element 240 behind it by another bonding wire 242 (best seen in FIG. 6). Thus, the same current flows through all the micro heating elements 240 in a zigzag fashion. Because the micro heating elements 240 are resistive, heat will be generated by the micro heating elements 240 when current flows through them.

When no current flows through the resistor 24, the section of the optical fiber 22 stays at one uniform temperature (the same as that of the TEC 23), so the index of refraction (n) of the fiber core 220 is uniform, and no Bragg Grating effect will affect light transmitting through the optical fiber 22 when it reaches the section with the TEC 23. This state is called an "all pass" state.

When current $I_i$ flows through the resistor 24, however, each micro heating element 240 of the resistor 24 generates heat at a constant rate as long as the current $I_i$ remains constant. Each micro heating element 240 raises the temperature in a cross section of the optical fiber 22 that sits directly beneath such micro heating element 240 and very close to either side of said cross section. The cross sections of the optical fiber 22 which are between the micro heating elements 240 remain at a temperature approximately the same as that of the TEC 23, since the TEC 23 has a much larger contacting area with the optical fiber 22 than the micro heating elements 240 have, and since the TEC 23 has a large heat transfer capacity. Hence, a series of uniform, evenly distributed "hot spots" develops along the optical fiber 22 when current flows in the micro heating elements 240. Because the index of refraction of the materials in the optical fiber core 220 varies with temperature, a periodic pattern of indexes of refraction varying between two values is generated inside the optical fiber core 220, with an index of refraction in the "hot spots" being different from that in the unheated areas. This periodic variation in the index of refraction constitutes a fiber Bragg grating (FBG). A distance between adjacent "hot spots" is the pitch ($\Lambda$) of the FBG 20, which determines what wavelength is most strongly reflected by the FBG 20.

Different values of current heat the "hot spots" to different temperatures, thus changing a difference between the indexes of refraction in the heated and in the un-heated areas. Because the reflection ratio of incident light of an FBG is determined by the difference in indexes of refraction in the "hot" areas and in the "cold" areas, and by the length of the grating, then by choosing the temperature of the TEC 23, as well as the length of the grating area, a reasonable driving current ($I_{max}$) can be found whereat nearly 100% reflection can be achieved for the wavelength that meets the Bragg condition. The state of the FBG at this driving current value is called an "all reflect" state. In this state, a decrease in the driving current will cause that particular wavelength of the incident light to be partially reflected and partially passed.

Thus, for a particular wavelength that meets the Bragg condition, the FBG 20 can achieve the "all reflect" (100% reflection) state when $I_i = I_{max}$, the "all pass" state (100% pass) when $I_i = 0$, and a "partial reflection" (thus partially pass state) when $0 < I_i < I_{max}$, by choosing different driving currents. Therefore, the FBG 20 functions as a dynamic fiber Bragg grating.

Referring again to FIG. 1, the FBG 20 is disposed between and connected with the second circulator port 12 of the first optical circulator 10 and the second circulator port 32 of the second optical circulator 30. The FBG 20 can reflect an optical signal with a particular wavelength $\lambda_i$, according to the distance between the adjacent micro heating elements 240 (best see FIG. 3), wherein the wavelength $\lambda_i$ is among the wavelengths from $\lambda_1$ to $\lambda_N$ of the optical WDM signal.

The operation of the re-configurable OADM 800 is described as follow:

When the FBG 20 is put in the "all reflect" state, the FBG 20 reflects an optical signal with the wavelength $\lambda_i$, and the re-configurable OADM 800 functions to add-drop the optical signal with the wavelength $\lambda_i$ from the optical WDM signal. The optical WDM signal enters the re-configurable OADM 800 from the first circulator port 11. The optical WDM signal is routed from the first circulator port 11 to the second circulator port 12, and passes into the FBG 20. The optical signal with the wavelength $\lambda_i$ is reflected back to the second circulator port 12 by the FBG 20, and is routed from the second circulator port 12 to the third circulator port 13. Thus, the optical signal with the wavelength $\lambda_i$ is dropped from the WDM signal. The remaining optical signals with the wavelengths different from the wavelength $\lambda_i$ pass through the FBG 20 and into the second circulator port 32 of the second optical circulator 30. The remaining optical signals are routed from the second circulator port 32 to the third circulator port 33, thus being output from the re-configurable OADM 800. In the meantime, a new optical signal can be added by entering the first circulator port 31, wherein the new optical signal carries new information and has the same wavelength $\lambda_i$. The new optical signal is routed from the first circulator port 31 to the second circulator port 32, and is also reflected back to the second circulator port 32 by the FBG 20. The new optical signal is then routed from the second circulator port 32 to the third circulator port 33, and is output from the re-configurable OADM 800. Thus, the new optical signal joins the remaining optical signals at the third circulator port 33 to forming a newly-created optical WDM signal.

When the FBG 20 is put in the "all pass" state, optical signals pass through the FBG 20, no matter what wavelengths they have. The optical WDM signal passes through the first circulator port 11, the second circulator port 12, the FBG 20 and the second circulator port 32 in turn, and is then output from the third circulator port 33. No optical signal is dropped or added in the re-configurable OADM 800.

Therefore, an optical signal with the wavelength $\lambda_i$ is selectively dropped or not dropped from the optical WDM signal by putting the FBG 20 in the "all reflective" or "all pass" state, wherein the state of the FBG 20 is under the control of the current $I_i$ flowing through the resistor 24 (best see FIG. 4).

Figure 2:
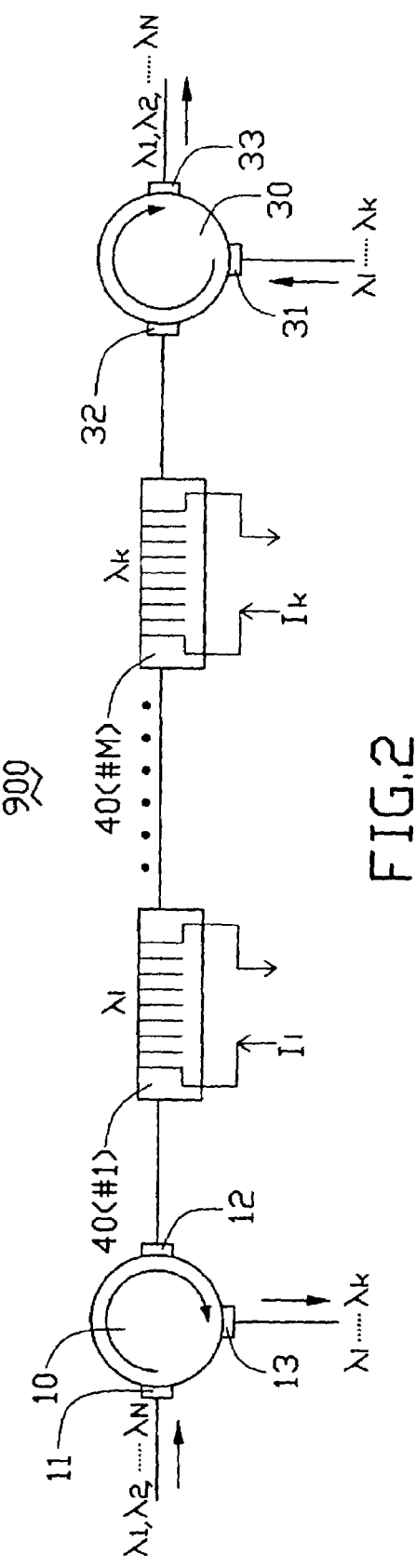
FIG. 2 is a schematic view of a re-configurable OADM in accordance with a second embodiment of the present invention.
Figure 3:
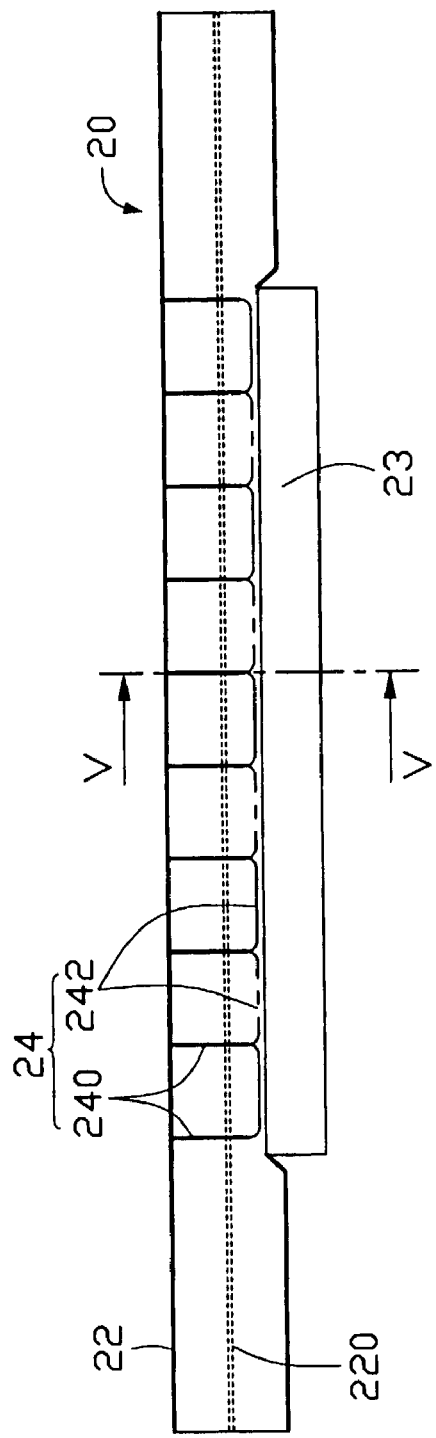
FIG. 3 is a side view of a fiber Bragg grating (FBG) of FIG. 1.

Referring to FIG. 2, an optical WDM signal passes into a re-configurable OADM 900 in accordance with a second embodiment of the present invention. The optical WDM signal includes a plurality of optical signals with different wavelengths from $\lambda_1$ to $\lambda_N$, wherein N is an integer higher than 1. The re-configurable OADM 900 includes a first optical circulator 10, a second optical circulator 30, and a plurality of FBGs from 40(#1) to 40(#M), wherein 1<M≦N.

Comprehensibly, the first and second optical circulator 10, 30 have the same structure described in the first embodiment, and each FBG 40 also has the same structure as the FBG described in the first embodiment. The FBGs from 40(#1) to 40(#M) are connected in series and are disposed between the first optical circulator 10 and second optical circulator 30. The first FBG 40(#1) is connected with the second circulator port 12 of the first optical circulator 10, and the last FBG 40(#M) is connected with the second circulator port 32 of the second optical circulator 30. Each FBG 40 can reflect an optical signal with a particular wavelength, and the FBGs taken together, from 40(#1) to 40(#M), can reflect optical signals having different wavelengths from $\lambda_i$, to $\lambda_k$, respectively, wherein the wavelengths from $\lambda_i$ to $\lambda_k$ are among the wavelengths from $\lambda_1$ to $\lambda_N$ of the optical WDM signal.

The operation of the re-configurable OADM 900 is substantially the same as the operation described in the first embodiment. The only difference is that more than one FBGs can be put in its corresponding "all reflect" or "all pass" states respectively in the second embodiment.

The optical WDM signal enters the first circulator port 11 of the first optical circulator 10, and is routed to the second circulator port 12. When some of the FBGs from 40(#1) to 40(#M) are selected to be put in their "tall reflect" states and the rest of the FBGs from 40(#1) to 40(#M) are put in their "all pass" states, the optical signals having the same wavelengths as the given wavelengths of the selected FBGs 40 are reflected by the selected FBGs 40 and dropped from the third circulator port 13 of the first optical circulator 10. The "given wavelength" above is defined as the wavelength reflected by a subject FBG 40 when it is in its "all reflect" state. The remaining optical signals pass through the FBGs from 40(#1) to 40(#M) in turn, and are routed from the second circulator port 32 to the third circulator port 33. In the meantime, new optical signals having the same wavelengths as the dropped optical signals but carrying new information can be added by entering the first circulator port 31. The new optical signals are also reflected by the selected FBGs 40 and are output from the third circulator port 33, and join the remaining optical signals to forming a newly-created optical WDM signal. The number of the selected FBGs 40 is changeable, and the number of the wavelengths of the dropped optical signals is likewise changeable. Therefore, the re-configurable OADM 900 can add and drop the desired optical signals from the optical WDM signal by putting the corresponding FBGs 40 in the "all reflect" state and the rest of the FBGs 40 in the "all pass" state, wherein the states of the FBGs from 40(#1) to 40(#M) are under the control of the currents from $I_i$ to $I_k$ flowing through the corresponding resistors 24 (best indicated in FIG. 2 and FIG. 4), respectively.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A re-configurable optical add-drop multiplexer (OADM) adapted to receive an optical wavelength division multiplexing (WDM) signal, comprising:

a first optical circulator having a first circulator port, a second circulator port and a third circulator port, wherein an optical signal passing into the first circulator port is routed to the second circulator port and an optical signal passing into the second circulator port is rooted to the third circulator port;

a second optical circulator having a first port, a second port and a third port, wherein an optical signal passing into the first port is routed to the second port and an optical signal passing into the second port is routed to the third port;

a fiber Bragg grating (FBG) having an optical fiber, a cooler and a plurality of heating elements, the heating elements being evenly spaced a fixed distance apart and being arranged on the optical fiber, the optical fiber having an optical fiber core made of a material whose index of refraction varies with temperature, the cooler being mounted on the optical fiber for maintaining a plurality of sections between pairs of adjacent heating elements of the optical fiber at a pre-determined temperature, the FBG having a first state in which it reflects an optical signal with a determined wavelength and passes all optical signals having other than the determined wavelength, and a second state in which all the optical signals pass through it; wherein the FBG is connected with the second circulator port of the first optical circulator and the second port of the second optical circulator, and the FBG is in the first state selectively for adding an optical signal in the optical WDM signal through the first port of the second optical circulator and for dropping an optical signal from the optical WDM signal through the third circulator port of the first optical circulator.

2. The re-configurable OADM as described in claim 1, wherein the wavelength of the optical signal reflected by the FBG is determined by the distance between the heating elements.

3. The re-configurable OADM as described in claim 1, wherein the beating elements generate heat when current flows through them.

4. The re-configurable OADM as described in claim 1, wherein the state of the FBG is under the control of current flowing through the heating elements.

5. The re-configurable OADM as described in claim 1, wherein the heating elements are deposited in a periodic pattern along an outside surface of the optical fiber.

6. The re-configurable OADM as described in claim 5, wherein the index of refraction of the cross section of the optical fiber core directly beneath each heating clement varies with the current flowing through the heating element.

7. The re-configurable OADM as described in claim 1, wherein the optical WDM signal is input into the re-configurable OADM through the first circulator port of the first optical circulator and is output from the re-configurable OADM through the third port of the second optical circulator.

8. The re-configurable OADM as described in claim 1, wherein the cooler is mounted on one side of one section of the optical fiber, which side is a flat surface.

9. The re-configurable OADM as described in claim 1, wherein each heating element has a shape of the letter C, with an opening thereof facing the cooler.

10. A re-configurable optical add-drop multiplexer (OADM) adapted to receive an optical wavelength division multiplexing (WDM) signal, comprising:
- a first optical circulator having a first circulator port, a second circulator port and a third circulator port, wherein an optical signal passing into the first circulator port is routed to the second circulator port, and an optical signal passing into the second circulator port is routed to the third circulator port;
- a second optical circulator having a first port, a second port and a third port, wherein an optical signal passing into the first port is routed to the second port, and an optical signal passing into the second port is routed to the third port;
- a plurality of fiber Bragg gratings (FBGs), each FBG having an optical fiber, a cooler and a plurality of heating elements, the optical fiber having an optical fiber core made of a material wherein an index of refraction of the material varies with temperature, the heating elements being evenly spaced a fixed distance apart and being arranged on the optical fiber, the cooler being mounted on the optical fiber for maintaining a plurality of sections between pairs of adjacent heating elements of the optical fiber at a pre-determined temperature, each FBG having a first state in which it reflects an optical signal with a given wavelength and passes optical signals having other than the given wavelength, and a second state in which all the signals pass through it; wherein
- the FBGs are connected in series and are positioned between the first optical circulator and the second optical circulator, the first FBG is connected with the second circulator port of the first optical circulator and the last FBG is connected with the second port of the second optical circulator, and each FBG is in the corresponding first state selectively for adding optical signals into the first port of the second optical circulator and for dropping optical signals from the third circulator port of the first optical circulator.

11. The re-configurable OADM as described in claim 10, wherein the wavelength of the optical signal reflected by each FBG is determined by the distance between the corresponding heating elements.

12. The re-configurable OADM as described in claim 10, wherein the beating elements generate heat when current flows through them.

13. The re-configurable OADM as described in claim 10, wherein the state of each FBG is under the control of current flowing through the heating elements.

14. The re-configurable OADM as described in claim 10, wherein the heating elements are deposited in a periodic pattern along an outside surface of the corresponding optical fiber.

15. The re-configurable OADM as described in claim 14, wherein the index of refraction of the cross section of the optical fiber core directly beneath each heating element varies with the current flowing through the heating element.

16. The re-configurable OADM as described in claim 10, wherein the optical WDM signal is input into the re-configurable OADM through the first circulator pod of the first optical circulator and is output from the re-configurable OADM trough the third port of the second optical circulator.

17. The re-configurable OADM as described in claim 10, wherein the re-configurable OADM puts the desired FBGs in the first state end the rest of the FBGs in the "all pass" state to drop the optical signals having the same wavelengths as the given wavelengths of the desired FBGs from the optical WDM signal.

18. The re-configurable OADM as described in claim 10, wherein the cooler is mounted on one side of one section of the optical fiber, which side is a flat surface.

19. The re-configurable OADM as described in claim 10, wherein each heating element has a shape of the letter C, with an opening thereof facing the cooler.

* * * * *